United States Patent [19]
Kaizik et al.

[11] Patent Number: 5,993,763
[45] Date of Patent: Nov. 30, 1999

[54] CATALYST AND PROCESS FOR DECOMPOSING HCN IN GASES

[75] Inventors: Alfred Kaizik; Dietrich Maschmeyer; Franz Nierlich, all of Marl, Germany

[73] Assignee: Huels Aktiengesellschaft, Marl, Germany

[21] Appl. No.: 08/958,584

[22] Filed: Oct. 28, 1997

Related U.S. Application Data

[62] Division of application No. 08/524,839, Sep. 7, 1995, abandoned.

[30] Foreign Application Priority Data

Sep. 7, 1994 [DE] Germany ............................ 44 31 788

[51] Int. Cl.$^6$ ...................................................... C01C 3/00
[52] U.S. Cl. ........................... 423/236; 423/237; 423/238
[58] Field of Search ...................................... 423/236, 237, 423/238

[56] References Cited

U.S. PATENT DOCUMENTS

| | | |
|---|---|---|
| 4,085,193 | 4/1978 | Nakajima et al. . |
| 4,113,660 | 9/1978 | Abe et al. . |

FOREIGN PATENT DOCUMENTS

| | | |
|---|---|---|
| 0 051 156 | 5/1982 | European Pat. Off. . |
| 24 58 888 | 6/1975 | Germany . |
| 26 58 569 | 7/1977 | Germany . |
| 37 36 478 | 5/1989 | Germany . |
| 43 19 234 | 12/1994 | Germany . |

OTHER PUBLICATIONS

Database WPI, Section Ch, Week 7809, Derwent Publications Ltd., London, GB, AN 78–16602A & JP–A–53 005 065 (Nitto Chem IND KK), Jan. 18, 1978.

*Primary Examiner*—Gary P. Straub
*Assistant Examiner*—Melanie C. Wong
*Attorney, Agent, or Firm*—Oblon, Spivak, McClelland, Maier & Neustadt, P.C.

[57] ABSTRACT

A catalyst based on titanium oxide, zirconium oxide or combinations thereof for decomposing HCN in gases, which additionally comprises:

molybdenum, vanadium, tungsten, manganese, silicon, selenium, tellurium, niobium, tantalum, sulfur, phosphorus in the form of their oxides, hydrated oxides, other compounds, or combinations thereof.

10 Claims, No Drawings

CATALYST AND PROCESS FOR DECOMPOSING HCN IN GASES

This is a division of abandoned application Ser. No. 08/524,839 filed on Sep. 7, 1995.

BACKGROUND OF THE INVENTION

1. Field of the Invention

The invention relates to a catalyst based on titanium oxide and/or zirconium oxide for decomposing HCN in gases and also to a process for decomposing HCN in gases.

2. Description of the Background

Numerous hydrocarbon-containing gas mixtures, such as, for instance, the gas mixtures obtained in the gasification of coal or oil or other hydrocarbon-containing substances, have to be freed of acid gas constituents such as $H_2S$ before they are further processed. The $H_2S$ removal is customarily, particularly in the case of low $H_2S$ contents, carried out by gas scrubbing using a chemically or physically active solvent. Since HCN present in the gas mixture is dissolved by the solvents customarily used and because HCN is not completely removed from the solvent in the regeneration of the solvent, the result is HCN enrichment of the solvent, often even decomposition of the solvent by HCN. HCN is therefore removed by catalytic decomposition in a manner known per se prior to acid gas scrubbing.

Furthermore, in many industrial processes it is desirable to decompose HCN in gases without in the process catalyzing other reactions than the HCN decomposition in the gas.

The as yet unpublished, German Patent Application 43 19 234 teaches a process for removing HCN from gas mixtures containing at least HCN and sulfur compounds, particularly from gas mixtures obtained by partial oxidation or gasification of coal or oil. The process is the catalytic decomposition of HCN, with the gas mixture being brought into contact with a catalyst which decomposes the HCN by hydrogenation and/or by hydrolysis. COS present in the gas mixture is at least partially decomposed by hydrolysis over this catalyst. In particular, catalysts are employed in which the catalyst support is on titanium oxide and/or zirconium oxide. Chromium trioxide is a further catalytically active component.

Catalysts containing chromium trioxide can present problems in their preparation and disposal because of the high toxicity of chromium trioxide, since strict safety and environmental protection obligations have to be met when handling chromium trioxide. Furthermore, the catalysts of the prior art have an activity which is too low, so that either large reactor volumes or high reaction temperatures are required. A need, therefore, continues to exist for a catalyst of improved activity for the removal of HCN from HCN containing gases.

SUMMARY OF THE INVENTION

Accordingly, one object of the present invention is to provide a catalyst and a process for decomposing HCN in gases, where the catalyst used should have a higher activity and be more environmentally compatible.

Briefly, this object and other objects of the present invention as hereinafter will become more readily apparent can be attained in a catalyst for the HCN decomposition reaction which is based on titanium oxide, zirconium oxide or combinations thereof which contains as additionally catalytically active components molybdenum, vanadium, tungsten, manganese, silicon, selenium, tellurium, niobium, tantalum, sulfur, phosphorus in the form of their oxides, hydrated oxides, other compounds, or combinations thereof.

DETAILED DESCRIPTION OF THE PREFERRED EMBODIMENTS

It has now been found that the present catalyst, based on titanium oxide and/or zirconium oxide, is very environmentally compatible and has a surprisingly high activity in promoting the decomposition of HCN in gases.

The catalyst preferably contains from 0.05 to 30% by weight each of molybdenum, vanadium, tungsten, manganese, silicon, selenium, tellurium, niobium, tantalum, sulfur, phosphorus in the form of their oxides, hydrated oxides, other compounds or combinations thereof, calculated as oxides of their highest oxidation state.

Furthermore, the catalyst of the invention can also contain additional components such as, for example, alkali metal oxides, alkaline earth metal oxides, iron oxide, cobalt oxide, nickel oxide, or combinations thereof, each in amounts of from 0.1 to 8% by wt. calculated as the oxide of the highest oxidation state of the metal.

The catalyst of the invention can be prepared by known methods, which are described, for example, in DE-C 24 58 888, DE-C 26 58 569 and DE-A 37 36 478.

The catalyst of the invention can have a great variety of shapes. It can thus be used, for example, in the form of powders, pellets, extrudates, plates or monolithic honeycomb bodies. The preferred shape is as monolithic honeycomb bodies. Such monolithic honeycomb bodies have a multiplicity of parallel channels whose axes are oriented in the direction of the gas stream.

The HCN-containing gas may contain a number of other compounds or materials. The HCN-containing gas thus may contain water vapor, as well as reducing compounds such as, for example, hydrogen and carbon monoxide. Furthermore, for example, hydrocarbons and olefins can also be present in the HCN-containing gas.

The process of the invention is particularly suitable for decomposing HCN in low-temperature carbonization gases from the gasification of coal and oil.

The HCN content of the gas in the process of the invention should appropriately be from 0.001 to 2,000 ppm by volume.

The HCN-containing gas is preferably passed over the catalyst at a space velocity (GHSV) of from 1,000 $h^{-1}$ to 100,000 $h^{-1}$, particularly preferably at a space velocity (GHSV) of from 10,000 $h^{-1}$ to 50,000 $h^{-1}$. The abbreviation "GHSV" means "gas hourly space velocity".

In the process of the invention, the HCN-containing gas is normally passed over the catalyst at temperatures of from 20 to 200° C., preferably from 100 to 170° C.

The catalysts of the invention and the process of the invention offer very great industrial advantages. In the processes of the prior art, the decomposition of HCN generally proceeds only at temperatures above 200° C. In contrast, in the process of the invention, the decomposition of HCN can be carried out at substantially lower temperatures. In addition, the high activity of the catalyst of the invention makes possible high space velocities, so that a great amount of catalyst volume and thus also reactor volume can be saved. A further great advantage of the process of the invention is that it is also possible to use catalysts in honeycomb form and the pressure drop can thus be kept extremely small.

Having generally described this invention, a further understanding can be obtained by reference to certain specific examples which are provided herein for purposes of illustration only and are not intended to be limiting unless otherwise specified.

The examples were carried out in a continuously operated tube reactor having a length of 310 mm and an internal diameter of 29.7 mm. The catalyst was introduced as a bed. The operating temperature was regulated via an electrically operated gas preheater. The gas flowing through the reactor was metered in by means of flow regulation. The HCN concentration in the gas was measured by sorption in dilute sodium hydroxide solution and subsequent volumetric determination using the test system "Mikroquant CN" from Merck.

COMPARATIVE EXAMPLE 1

Example 1 was carried out in accordance with the teachings of DE-A 35 17 169.

For this purpose, the reactor was filled to a depth of about 22 cm with pellets (5×5 mm) of titanium dioxide, prepared from the material P 25 manufactured by Degussa. This material is highly pure, in particular free of possible oxo acids (apart from $TiO_2$), consists predominantly of anatase and has a BET surface area of about 40 $m^2/g$.

A stream of HCN-containing gas having the composition 18% $H_2$, 18% CO, 6% $H_2O$ and 58% $N_2$ was then passed over the catalyst. The table below gives the results.

| Temperature ° C. | GHSV ($h^{-1}$) | HCN ppm | HCN conversion % |
|---|---|---|---|
| 250 | 1000 | 102 | 95 |
| 250 | 3000 | 107 | 81 |
| 200 | 3000 | 103 | 49 |
| 170 | 3000 | 106 | 32 |
| 150 | 3000 | 107 | 19 |

Example 1

(According to the Invention)

a.) Preparation of a sulfate-containing catalyst 2,000 g of a $TiO_2$ catalyst support extruded in 4 mm strands and having a BET surface area of about 50 $m^2/g$ (H 9050 from Hüls AG) was impregnated with a solution of 70 g of $H_2SO_4$ in 440 ml of water and dried at 150° C. The sulfate content of the catalyst was about 3.5% by weight.

b.) Determination of the HCN conversion

The HCN conversion was determined as in comparative Example 1, but the reactor was filled to a length of only 40 mm with the catalyst described above under a.). The table below gives the composition of the gas used and the results obtained.

| Temperature ° C. | GHSV $h^{-1}$ | $H_2O$ % | $H_2$ % | CO % | $N_2$ % | HCN ppm | HCN conversion % |
|---|---|---|---|---|---|---|---|
| 119 | 3000 | 5 | 76 | — | 19 | 111 | 100 |
| 152 | 3000 | 5 | 76 | — | 19 | 111 | 100 |
| 121 | 6000 | 5 | 76 | — | 19 | 107 | 100 |
| 153 | 18000 | 5 | 15 | — | 80 | 92 | 22.4 |
| 171 | 11000 | 5 | 15 | — | 80 | 123 | 39.0 |
| 173 | 3000 | 5 | 15 | — | 80 | 167 | 93 |
| 153 | 2853 | 5 | 15 | — | 80 | 105 | 84.1 |
| 172 | 3000 | 5 | 76 | — | 19 | 135 | 100 |
| 173 | 3000 | 5 | 15 | — | 80 | 132 | 92.3 |
| 173 | 3000 | 5 | — | — | 95 | 120 | 73 |
| 153 | 3000 | 15 | — | — | 85 | 114 | 96.8 |
| 154 | 3000 | 5 | 18 | 18 | 59 | 130 | 88.5 |
| 153 | 3000 | 15 | 18 | 18 | 49 | 128 | 99.6 |
| 151 | 7300 | 15 | 18 | 18 | 49 | 128 | 99.1 |
| 173 | 9000 | 15 | 18 | 18 | 49 | 128 | 100 |
| 173 | 9000 | 5 | 18 | 18 | 59 | 128 | 91 |

Comparative Example 2

(According to German Patent Application 43 19 234.3)

The procedure employed is described in Example 1(b), but the reactor was filled to a length of 40 mm with a catalyst comprising extrudates having a diameter of 4 mm. The BET surface area was about 50 $m^2/g$; about 8.0% of chromate was sorbed on the surface. Prior to the experiment, the catalyst was reduced in hydrogen at 350° C. The gas is composed of 20% $N_2$, 6% $H_2O$ and 74% $H_2$. The table below gives the results.

| Temperature ° C. | GHSV ($h^{-1}$) | HCN ppm | HCN conversion % |
|---|---|---|---|
| 150 | 1180 | 110 | 91 |
| 170 | 1180 | 110 | 93 |
| 200 | 1180 | 110 | 99 |
| 245 | 1180 | 110 | 100 |
| 160 | 2940 | 50 | 30 |
| 200 | 2940 | 50 | 81 |
| 250 | 2940 | 50 | 96 |

Example 2

(According to the Invention)

a.) Preparation of a molybdate-containing catalyst 2,000 g of a $TiO_2$ catalyst support extruded in 4 mm strands and having a BET surface area of about 50 $m^2/g$ (H 9050 from Hüls AG) was impregnated with a solution of 526 g of ammonium heptamolybdate tetrahydrate in 650 ml of total solution (solvent: water), dried at 150° C. and calcined at 350° C. The $MoO_3$ content of the catalyst was about 14.0% by weight.

b.) Determination of the HCN conversion

The HCN conversion was determined as described in Example 1(b), but the reactor was filled to a length of 40 mm with the catalyst described above under a.). The gas is composed of 20% $N_2$, 6% $H_2O$ and 74% $H_2$. The table below gives the results.

| Temperature ° C. | GHSV ($h^{-1}$) | HCN ppm | HCN conversion % |
|---|---|---|---|
| 250 | 1000 | 103 | 100 |
| 250 | 3000 | 102 | 100 |
| 200 | 3000 | 101 | 100 |
| 170 | 3000 | 105 | 100 |
| 150 | 3000 | 104 | 99.5 |
| 170 | 9000 | 106 | 100 |
| 170 | 15000 | 105 | 99 |
| 120 | 9000 | 106 | 99 |

Example 3

(According to the Invention)

a.) Preparation of a tungstate-containing catalyst 2,000 g of a $TiO_2$ catalyst support extruded in 4 mm strands and having a BET surface area of about 50 $m^2/g$ (H 9050 from Hüls AG) was impregnated with a solution of 507 g of ammonium metatungstate hexahydrate in 850 ml of total solution (solvent:water), dried at 150° C. and calcined at 350° C. The $WO_3$ content of the catalyst was about 23.0% by weight.

b.) Determination of the HCN conversion

The HCN conversion was determined as described in Example 1(b), but the reactor was filled to a length of 40 mm with the catalyst described above under a.). The gas is composed of 20% $N_2$, 6% H2O and 74% $H_2$. The table below gives the results.

| Temperature °C. | GHSV (h⁻¹) | HCN ppm | HCN conversion % |
|---|---|---|---|
| 170 | 3000 | 110 | 100 |
| 150 | 3000 | 102 | 99.6 |
| 170 | 9000 | 101 | 100 |
| 170 | 15000 | 112 | 99 |
| 120 | 9000 | 116 | 97 |

Example 4

(According to the Invention)

a.) Preparation of a phosphate-containing catalyst according to the invention 2,000 g of a TiO$_2$ catalyst support extruded in 4 mm strands and having a BET surface area of about 50 m$^2$/g (H 9050 from Hüls AG) was impregnated with a solution of 60 g of H$_3$PO$_4$ in 540 ml of total solution (solvent:water) and dried at 150° C. The PO$_4$ content of the catalyst was about 2.4% by weight.

b.) Determination of the HCN conversion

The HCN conversion was determined as described in Example 1(b), but the reactor was filled to a length of 40 mm with the catalyst described above under a.). The gas is composed 20% N$_2$, 6% H$_2$O and 74% H$_2$. The table below gives the results.

| Temperature °C. | GHSV (h⁻¹) | HCN ppm | HCN conversion % |
|---|---|---|---|
| 170 | 3000 | 120 | 100 |
| 150 | 6000 | 107 | 99.6 |
| 170 | 9000 | 109 | 100 |
| 170 | 15000 | 120 | 98 |
| 120 | 6000 | 124 | 94 |

Example 5

(According to the Invention)

a.) Preparation of a vanadate-containing catalyst according to the invention 2,000 g of a TiO$_2$ catalyst support extruded in 4 mm strands and having a BET surface area of about 50 m$^2$/g (H 9050 from Hüls AG) was impregnated with 800 ml of a solution of ammonium metavanadate (W(V$_2$O$_5$) 250 g/l) in water and dried at 150° C. The V$_2$O$_5$ content of the catalyst was about 20% by weight.

b.) Determination of the HCN conversion

The HCN conversion was determined as described in Example 2, but the reactor was filled to a length of only 40 mm with the catalyst described above under a.). The gas is composed of 20% N$_2$ 6% H$_2$O, 100 ppm HCN and 74% of H$_2$. At 170° C. and a GHSV of 3,000, the HCN conversion was 97%.

Example 6

(According to the Invention)

a.) Preparation of a selenate-containing catalyst according to the invention 2,000 g of a TiO$_2$ catalyst support extruded in 4 mm strands and having a BET surface area of about 50 m$^2$/g (H 9050 from Hüls AG) was impregnated with 800 ml of a solution of ammonium selenate (W(SeO$_2$)=70 g/l) in water and dried at 150° C. The SeO$_2$ content of the catalyst was about 3.5% by weight.

b.) Determination of the HCN conversion

The HCN conversion was determined as described in Example 1, but the reactor was filled to a length of 40 mm with the catalyst described above under a.). The gas is composed of 20% N$_2$, 6% H$_2$O, 100 ppm HCN and 74% H$_2$. At 170° C. and a GHSV of 3,000, the HCN conversion was 97.5%.

Example 7

(According to the Invention)

Doping of a Sulfate-Containing Catalyst with Iron, Nickel or Cobalt

The catalyst described in Example 1 was calcined at 250° C., then impregnated with a nitrate solution of iron, nickel or cobalt and again calcined at 250° C. The concentration of the metal in the finished catalyst was then about 5%. The hydrolysis activity of the catalyst was subsequently determined as described in Example 2(b). For this purpose, the reactor was filled to a length of 40 mm with the catalyst described above under a.). The gas is composed of 20% N$_2$, 6% H$_2$O, 100 ppm HCN and 74% H$_2$. At 120° C. and a GHSV of 3,000, the HCN conversion was 98% (nickel), 98.7% (iron), and 97.6% (cobalt).

Example 8

(According to the Invention)

Doping of a Molybdate-Containing Catalyst with Calcium, Strontium and Barium

The catalyst as described in Example 2 was calcined at 250° 1 C., then impregnated with a nitrate solution of calcium, strontium or barium and again calcined at 250° C. The concentration of the respective metal in the finished catalyst was then about 2.5%. The hydrolysis activity of the catalyst was subsequently determined as described in Example 2(b). For this purpose, the reactor was filled to a length of 40 mm with the catalyst described above under a.). The gas is composed of 20% N$_2$, 6% H$_2$O, 100 ppm HCN and 74% H$_2$. At 120° C. and a GHSV of 3,000, the HCN conversion was 97% (calcium), 99% (strontium), and 96.4% (barium).

Example 9

(According to the Invention)

Use of a Honeycomb Catalyst a.) Preparation of a molybdate-containing honeycomb catalyst according to the invention An extruded body having 16 hollow channels of square cross-section each having an edge length of about 3.2 mm and a thickness of the webs in between of about 1.1 mm and a length of 7.5 cm (catalyst support for the denitrogenation catalyst of KWH which has not been treated with additional active components) was impregnated with a solution of 526 g of ammonium heptamolybdate tetrahydrate in 650 ml of total solution (solvent: water), dried at 150° C. and calcined at 350° C. The MoO$_3$ content of the catalyst was about 14.0% by weight.

b.) Determination of the HCN conversion

The HCN conversion was determined using a method similar to the tests described above, but the impregnated catalyst body was installed in the reactor tube and sealed therein in such a way that gas flowed only through the internal channels. The gas was composed of 20% N$_2$, 6% H$_2$O and 74% H$_2$. The table below gives the results.

| Temperature °C. | GHSV (h⁻¹) | HCN ppm | HCN conversion % |
| --- | --- | --- | --- |
| 200 | 3000 | 110 | 100 |
| 170 | 3000 | 120 | 100 |
| 150 | 3000 | 104 | 99.5 |
| 170 | 9000 | 130 | 100 |
| 120 | 9000 | 112 | 87 |

The pressure drop over the reactor was, despite the reduced cross-sectional area, somewhat lower than for the catalysts in a bed. The example shows that application of the catalyst to a honeycomb body is possible in practice and brings technical advantages.

Example 10

(According to the Invention)

$ZrO_2$ Support a.) Preparation of a sulfate-containing catalyst according to the invention 100 g of $ZrO_2$ catalyst support pressed into 4×4 mm pellets and having a BET surface area of about 42 m²/g (own manufacture) were impregnated with a solution of 4 g of $H_2SO_4$ in 20 ml of water and dried at 150° C. The sulphate content of the catalyst was about 3.5% by weight.

b.) Determination of the HCN conversion

The HCN conversion was determined as in Example 2, but the reactor was filled to a length of 40 mm with the catalyst described above under a.). The gas is composed of 20% $N_2$, 6% $H_2O$, 100 ppm HCN and 74% $H_2$. At 120° C. and a GHSV of 3,000, the HCN conversion was 95.5%. In an experiment carried out for comparison in the same manner but without prior treatment of the support with sulfuric acid, a conversion of only 19% was measured under the same conditions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by LETTERS PATENT OF THE UNITED STATES IS:

1. A process for decomposing HCN in gases, comprising:

passing a HCN-containing gas comprising from 15–76% hydrogen, no more than 15% water vapor, nitrogen and optionally carbon monoxide over a catalyst comprising molybdenum, vanadium, tungsten, manganese, silicon, selenium, tellurium, niobium, tantalum, sulfur or phosphorus in the form of their oxide or hydrated oxides or combinations thereof, thereby effecting the reductive decomposition of HCN.

2. The process according to claim 1, wherein the HCN content of the gas is from 0.001 to 2,000 ppm by volume.

3. The process according to claim 1, wherein the HCN-containing gas contains water vapor.

4. The process according to claim 1, wherein the HCN-containing gas is passed over the catalyst at a space velocity (GHSV) of from 1,000 h⁻¹ to 100,000 h⁻¹.

5. The process according to claim 4, wherein the HCN-containing gas is passed over the catalyst at a space velocity (GHSV) of from 10,000 h⁻¹ to 50,000 h⁻¹.

6. The process according to claim 1, wherein the HCN-containing gas is passed over the catalyst at temperatures of from 20 to 200° C.

7. The process according to claim 6, wherein the HCN-containing gas is passed over the catalyst at temperatures of from 100 to 170° C.

8. The process according to claim 1, wherein said HCN-containing gas contains water vapor and at least one reducing compound selected from the group consisting of hydrogen and carbon monoxide.

9. The process according to claim 1, wherein said HCN-containing gas contains a hydrocarbon or olefin.

10. The process according to claim 1, wherein said HCN-containing gas is a gas from the gasification of coal or oil.

* * * * *